May 22, 1956      J. MONTNER      2,747,109

MAGNET FLIP-FLOP

Filed Sept. 4, 1953

*INVENTOR.*
JOSEPH MONTNER

BY

*William R. Lane*

ATTORNEY

United States Patent Office 2,747,109
Patented May 22, 1956

2,747,109
MAGNETIC FLIP-FLOP

Joseph Montner, Whittier, Calif., assignor to North American Aviation, Inc.

Application September 4, 1953, Serial No. 378,644

13 Claims. (Cl. 307—88)

This invention relates to multivibrators of the bistable type and, particularly to those constructed of magnetic circuits and diodes. Bistable multivibrators have become widely known in the computer art as flip-flops and will herein be so designated. The particular adaptation here described furnishes power or ceases furnishing power in accordance with externally supplied positive and negative pulses.

Magnetic circuits offer the advantages of reliability, ease of maintenance, and rugged construction over vacuum tube circuits. Having no filament, no warm-up period is required by a magnetic circuit and, also, power consumption is practically nonexistent in the stand-by state. Further, in vacuum tube circuits, heavy power drain on the multivibrator influences and, even, interrupts the operation. In contrast, the magnetic flip-flop can be operated to have considerable power gain and an output of considerable power.

Present magnetic flip-flops require trigger sources having substantial power and, similar to thyratron trigger circuits, are quite sensitive to the phase angle of the power source at the time the trigger pulse is applied. Consequently, the response time is always greater than half the period of the alternating power source in such circuits. The device of the invention operates with a minimum response time which closely approaches the half period of the power source. If the power source is of high frequency, the response time of the flip-flop of this invention may be made very small. Also, it requires a minimum of power from the trigger source. The output of this flip-flop is almost full line voltage when triggered on.

An object of this invention is to provide a rugged and reliable flip-flop.

It is a further object of this invention to provide an improved magnetic flip-flop.

Another object of this invention is to provide a magnetic flip-flop requiring a minimum of trigger power.

A still further object of the invention is to provide a flip-flop having considerable power output.

Other objects of this invention will become apparent from the following description taken in connection with the accompanying drawings, in which Fig. 1 is the half wave embodiment of the invention;

Figure 1:
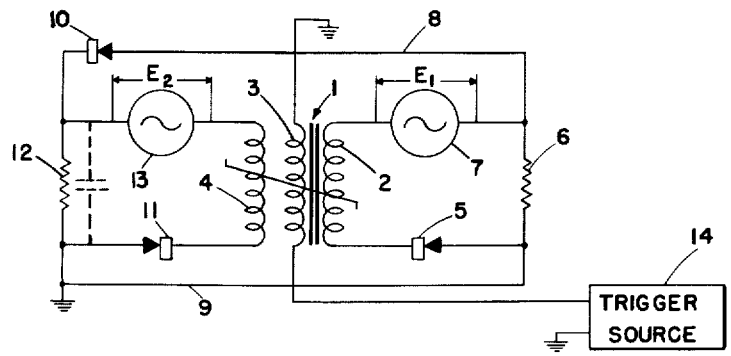

Referring to Fig. 1, a saturable reactor having a core 1 has a load winding 2, a control winding 3 for receiving trigger pulses, and a control winding 4 to reset the core. The load winding 2 is in series with diode 5, load 6 and alternating power source 7. When current is flowing to the load, it is half wave and undirectional by reason of diode 5. Feedback is obtained through lines 8 and 9 connected across the load. Diode 10 limits feedback to one direction. The core reset circuit is control winding 4, diode 11, impedance 12 (a resistor), and power source 13 which are all series connected. Power source 13 is in phase with power source 7, and may be the same power source. However, the voltage $E_1$ is greater than $E_2$ depending on the relative number of turns of windings 2 and 4, core material, etc.

Assuming the device is in the "off" state with the core 1 unsaturated. Load winding 2 presents a large impedance when core 1 is not saturated and no voltage appears across load 6. Every other half cycle voltage source 7 barely saturates core 1. In alternate half cycles source 13 through control winding 4 resets, or desaturates, the core. Consequently, little or no voltage develops across load 6 in the "off" state.

A trigger "on" pulse received through control winding 3, aids source 7 to move core 1 well into saturation and substantially all of the voltage of source 7 appears across load 6. This trigger "on" pulse need only be of sufficient energy to aid source 7 to saturate the core and once develop a voltage across load 6. This voltage is developed across resistor 12, also, and stray capacitance indicated in dotted lines aids in retaining this voltage across resistor 12 into the next half cycle when source 13 is attempting to reset the core. If the feedback voltage developed across resistor 12 is greater than the voltage $E_2$ of power source 13, diode 11 will be biased so that source 13 is not allowed to reset the core. Consequently, the core is not reset (remains saturated) and the source 7 continues its output to load 6 until energy is received to remove the core from saturation. A high impedance trigger source 14 furnishes the pulse necessary to remove the core from saturation and terminate the output to load 6.

In review of Fig. 1, it can be seen that during no output, source 13 resets the core in alternate half cycles and, during output, source 13 is exceeded by feedback voltage across resistor 12 and is not allowed to reset the core.

Figure 2:
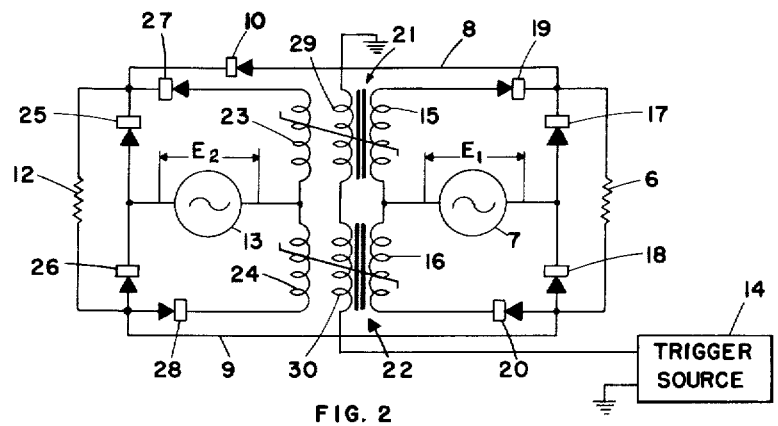
Fig. 2 is the full wave embodiment of the invention.

In Fig. 2, a full wave embodiment, source 7 is connected on one side to the common connection of load windings 15 and 16 and on the other side to the common connection of diodes 17 and 18. Diodes 17 and 18 are connected across load 6 and also to diodes 19 and 20, respectively. Diodes 19 and 20, complete each load circuit by being connected to the load windings 15 and 16, respectively, of saturable reactors 21 and 22.

The feedback circuit, lines 8 and 9 feed the voltage developed across load 6 to resistor 12. Source 13 is connected on one side to the common connection of control windings 23 and 24 and on the other side to the common connection of diodes 25 and 26. Diodes 25 and 26 are connected across resistor 12 and to diodes 27 and 28, respectively. Diodes 27 and 28 complete the reset control circuit by being connected to the control windings 23 and 24, respectively.

The second control windings 29 and 30 are connected in series to trigger source 14.

The output across both resistor 12 and load 6 is a full wave rectified voltage. Voltage $E_2$ is just sufficient to alternately reset each saturable core and $E_1$ is large enough to barely saturate from the reset state. The cores are of low loss construction, such as is common in high frequency transformers. Materials commonly used are the nickel-iron alloys. The cores have high permeability and their residual flux density is high with respect to saturation flux density.

Before the flip-flop is triggered "on," one core is moving toward saturation and the other is being reset. When the trigger "on" pulse appears, its polarity is such as to speed one core to saturation and reverse the voltage on the other core causing it to return and saturate. If either core saturates, an output voltage appears across load 6 and is fed back to cause the remaining core to saturate. Thus, when the device is "on" both cores are saturated.

The embodiment of Fig. 2 is advantageous in that the response of the magnetic amplifier to a trigger "on" pulse is relatively independent of the phase of the line voltage. That is, the trigger pulse need not be especially synchronized with sources 7 or 13. Lowering the pulse voltage increases the delay of the magnetic amplifier only slightly.

Figure 3:
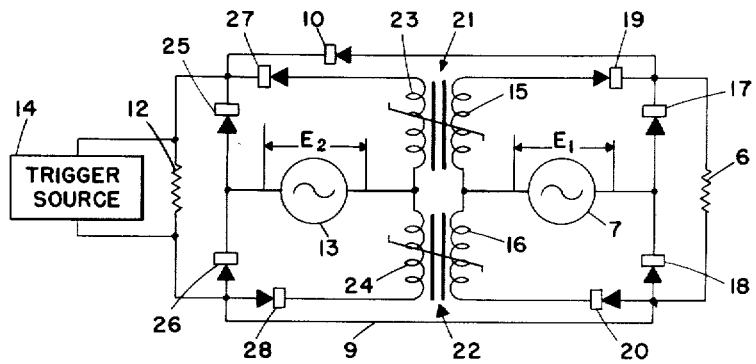
Fig. 3 illustrates a modified method of triggering.

Another method of triggering would be that shown in Fig. 3, where the trigger source 15 is connected across resistor 12. In such an embodiment, the trigger "on" power must be sufficient to prevent source 13 from resetting the core; and, in trigger "off," must be able to overcome the feedback voltage of lines 8 and 9 and let source 13 reset the core.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, saturable means, a load circuit adapted to saturate said saturable means, a control circuit adapted to reset said saturable means, and means for feeding back a portion of the load current flowing in said load circuit to said control circuit in a direction to oppose said control circuit resetting said saturable means.

2. In combination, saturable means, a load circuit adapted to saturate said saturable means, a control circuit adapted to reset said saturable means, and means for feeding back a portion of the load current flowing in said load circuit to said control circuit in a direction to prevent said control circuit from resetting said saturable means in accordance with the output of said load circuit.

3. In combination, saturable means, a load circuit adapted to saturate said saturable means, a control circuit adapted to reset said saturable means, means for feeding back a portion of the current flowing in said load circuit in a direction to oppose said control circuit resetting said saturable means, and a trigger circuit adapted to aid in saturating and desaturating said saturable means.

4. In combination, a saturable reactor comprising a core, a load winding and a first and second control winding, a unidirectional current path connected to said load winding tending to saturate said core, a unidirectional current path connected to said first control winding directed to desaturate said core, and feedback means from the output of said load winding to the unidirectional current path of said first control winding connected to prevent resetting said core in accordance with the output of said load winding.

5. In combination, a saturable reactor comprising a load winding and a first and second control winding, means for establishing a unidirectional flow of current in said load winding, means for establishing a unidirectional flow of current in said first control winding, and unidirectional feedback means from said load winding connected to oppose the flow of current in said first control winding, said second winding adapted to receive a trigger signal input.

6. In an electronic circuit, a saturable reactor comprising a saturable core, a load winding, first and second control windings, rectifier means disposed in circuit with said load winding whereby current flow in said load winding is unidirectional and tends to saturate said saturable core, rectifier means disposed in circuit with said first control winding whereby current flow in said control winding is unidirectional and tends to desaturate said saturable core, and feedback means from the output of said load winding to said first control winding connected oppositely to the flow of unidirectional current in said first control winding, whereby said first control winding is not allowed to desaturate said core when current flows in said load winding, said second control winding adapted to receive trigger pulses whereby the output of said load winding is initiated and terminated.

7. In combination, a plurality of saturable reactors each comprising a saturable core, a load winding, and first and second control windings, a pair of diodes each connected in series with a respective load winding whereby the current in each said load winding is unidirectional and tends to saturate said saturable cores, a pair of diodes each connected in series with a respective first control winding whereby the current in each said first control winding is unidirectional and tends to desaturate said saturable cores, and feedback means from said load windings to said first control windings connected to oppose said control windings desaturating said cores, said second control windings adapted to receive trigger pulses whereby the output of said load winding is initiated and terminated.

8. In combination, a plurality of saturable reactors each comprising a saturable core, a load winding, and first and second control windings, a pair of diodes each connected in series with a respective load winding whereby the current in each said load winding is unidirectional and tends to saturate said saturable cores, a pair of diodes each connected in series with a respective first control winding whereby the current in each said first control winding is unidirectional and tends to desaturate said saturable cores, and unidirectional feedback means from said load windings to said first control windings connected to prevent said control windings desaturating said cores in accordance with the output of said load windings, said second control windings adapted to receive trigger pulses whereby the output of said load winding is initiated and terminated.

9. In a magnetic flip-flop, a saturable reactor comprising a load winding and a first and second control winding, means for causing unidirectional current flow in said load winding tending to saturate the core of said saturable reactor, means for causing unidirectional current flow in said control winding tending to desaturate said core, and unidirectional feedback means from the output of said load winding to said first control winding connected in opposition to the unidirectional flow of current in said first control winding whereby said first control winding is prevented from desaturating said reactor in accordance with the output of said load winding, said second control winding adapted to receive positive and negative trigger pulses to initiate and terminate the saturation of said core.

10. In a multivibrator, a load circuit comprising a plurality of load windings, rectifier means in circuit with each said load winding, a plurality of control windings, rectifier means in circuit with each said load winding, an alternating power source adapted to energize said load windings, an alternating voltage source of the same frequency as said power source, adapted to energize said control windings, and unidirectional feedback means from the output of said load windings connected to oppose said alternating voltage source.

11. In a magnetic flip-flop, a saturable reactor comprising a saturable core, a load winding and a first and second control winding, a load circuit comprising a diode, a load, and an alternating power source connected in series with said load winding, a control circuit comprising a diode, an impedance and an alternating voltage source connected in series with said first control winding, a feedback circuit connected from said load to said impedance, and a diode disposed in said feedback circuit, said second control winding adapted to receive trigger pulses.

12. In a magnetic flip-flop, two saturable reactors each comprising a saturable core, a load winding and a first and second control winding, said load windings connected in series, said first control windings connected in series and said second control windings connected in series, a pair of diodes each in series with a respective load winding, a load disposed in the output of said series-connected load windings, a second pair of similarly directed diodes connected in series across said load, an alternating power source connected between the common connection of said series-connected load windings and the common connection of said second pair of diodes, an impedance connected in series with said control windings, a third pair of diodes each in series with a respective first control winding, an impedance connected in series with said diodes, a fourth pair of similarly directed diodes connected in series across said impedance, a feedback circuit connected from said load to said impedance, and a diode disposed in said feedback circuit, said second control windings adapted to receive pulses from a trigger source.

13. The combination recited in claim 12 wherein is included a power source connected between the common connection of said second pair of diodes and the common connection of said load windings, and a voltage source connected between the common connection of said fourth pair of diodes and the common connection of said first control windings.

References Cited in the file of this patent

UNITED STATES PATENTS

| | | |
|---|---|---|
| 2,519,513 | Thompson | Aug. 22, 1950 |
| 2,652,501 | Wilson | Sept. 15, 1953 |

UNITED STATES PATENT OFFICE
CERTIFICATE OF CORRECTION

Patent No. 2,747,109                                      May 22, 1956

Joseph Montner

It is hereby certified that error appears in the printed specification of the above numbered patent requiring correction and that the said Letters Patent should read as corrected below.

Column 4, line 53, for "load" read -- control --; line 56, after the word "source" strike out the comma.

Signed and sealed this 5th day of November 1957.

(SEAL)
Attest:

KARL H. AXLINE
Attesting Officer

ROBERT C. WATSON
Commissioner of Patents

Disclaimer 2,747,109.—*Joseph Montner*, Whittier, Calif. MAGNETIC FLIP-FLOP. Patent dated May 22, 1956. Disclaimer filed Apr. 21, 1961, by the assignee, *North American Aviation, Inc.*

Hereby enters this disclaimer to claims 1, 2, 3, and 10 of said patent.

[*Official Gazette May 30, 1961.*]